United States Patent
Hu et al.

(10) Patent No.: US 12,218,589 B2
(45) Date of Patent: Feb. 4, 2025

(54) CONTROL CIRCUIT FOR DC-DC CONVERTERS WITH CURRENT LIMIT AND CONTROL METHOD THEREOF

(71) Applicant: Chengdu Monolithic Power Systems Co., Ltd., Chengdu (CN)

(72) Inventors: Wangmiao Hu, Hangzhou (CN); Lijie Jiang, Hangzhou (CN); Fangyu Zhang, Hangzhou (CN)

(73) Assignee: Chengdu Monolithic Power Systems Co., Ltd., Sichuan (CN)

( * ) Notice: Subject to any disclaimer, the term of this patent is extended or adjusted under 35 U.S.C. 154(b) by 286 days.

(21) Appl. No.: 17/969,272

(22) Filed: Oct. 19, 2022

(65) Prior Publication Data

US 2023/0134098 A1 May 4, 2023

(30) Foreign Application Priority Data

Nov. 1, 2021 (CN) .......................... 202111282799.4

(51) Int. Cl.
  *H02M 3/156* (2006.01)
  *H02M 1/00* (2006.01)
  *H02M 1/32* (2007.01)

(52) U.S. Cl.
  CPC ....... *H02M 3/1566* (2021.05); *H02M 1/0009* (2021.05); *H02M 1/0025* (2021.05); *H02M 1/325* (2021.05); *H02M 3/156* (2013.01)

(58) Field of Classification Search
  CPC .... H02M 3/1566; H02M 3/156; H02M 3/158; H02M 1/0025; H02M 1/0003; H02M 1/32; H02M 1/325
  See application file for complete search history.

(56) References Cited

U.S. PATENT DOCUMENTS

| | | | |
|---|---|---|---|
| 8,395,368 B2 | 3/2013 | Qian | |
| 9,356,510 B2 | 5/2016 | Lijie | |
| 9,473,027 B2 | 10/2016 | Yan | |
| 9,520,778 B2 | 12/2016 | Lijie | |
| 10,348,197 B2 | 7/2019 | Chao | |
| 10,498,234 B2 | 12/2019 | Chao | |
| 10,673,336 B2 | 6/2020 | Lijie | |
| 10,756,621 B2 | 8/2020 | Binci | |
| 10,951,116 B2 | 3/2021 | Chao | |
| 11,043,896 B1* | 6/2021 | Ge | H02M 3/156 |
| 2019/0302818 A1* | 10/2019 | Liu | H02M 3/156 |
| 2019/0305674 A1* | 10/2019 | Liu | H02M 3/156 |
| 2023/0138397 A1* | 5/2023 | Jiang | H02M 1/0025 |
| | | | 363/13 |

* cited by examiner

*Primary Examiner* — Alex Torres-Rivera
(74) *Attorney, Agent, or Firm* — Perkins Coie LLP

(57) ABSTRACT

A control circuit for a DC-DC converter has an over-current comparison circuit, an adaptive voltage position (AVP) control circuit and a switching control circuit. The over-current comparison circuit provides an over-current comparison signal by comparing an output current with a current limit value. The AVP control circuit provides a position signal based on a voltage identification code, an output voltage, an output current and the over-current comparison signal. The switching control circuit controls the DC-DC converter based on the position signal. When the output current is smaller than the current limit value, the output voltage varies along a first voltage position curve, and otherwise, the output voltage varies along a second voltage position curve.

20 Claims, 9 Drawing Sheets

CONTROL CIRCUIT FOR DC-DC CONVERTERS WITH CURRENT LIMIT AND CONTROL METHOD THEREOF

CROSS-REFERENCE TO RELATED APPLICATIONS

This application claims the benefit of CN application 202111282799.4, filed on Nov. 1, 2021, and incorporated herein by reference.

TECHNICAL FIELD

The present invention generally relates to electronic circuits, and more particularly, relates to adaptive voltage position (AVP) control circuits for DC-DC converters and control methods thereof.

BACKGROUND

In power supplies for microprocessors with high current and low voltage, the power performance, especially the transient response is vital. Adaptive voltage position (AVP) control is widely used to reduce voltage deviations of the output voltage (i.e., the power supply of microprocessors) during the load step to insure the system stability.

The basic principle of traditional AVP control is shown in FIG. 1. An output voltage Vo decreases linearly from a voltage level V1 to a voltage level V2, as an output current Io (i.e., load current) increases from a minimum value (e.g., from zero) to a maximum load point Imax, wherein V1 may be a reference voltage set according to a voltage identification code (VID) from a processor load.

With fast development of the microprocessor, power supplies with higher voltage levels are needed. The output voltage at full load may be very low, which may be close to a lowest threshold of the CPU operational voltage, if traditional AVP control is adopted. Thus, an improved voltage regulator with better output voltage control is in high demand.

SUMMARY

Embodiments of the present invention are directed to a control circuit for a DC-DC converter, wherein the DC-DC converter comprises at least one switch, and is configured to receive an input voltage and to provide an output voltage and an output current. The control circuit comprises an over-current comparison circuit, an adaptive voltage position (AVP) control circuit, and a switching control circuit. The over-current comparison circuit is configured to provide an over-current comparison signal by comparing the output current with a current limit value. The adaptive voltage position (AVP) control circuit is configured to provide a position signal based on a voltage identification code, a set of adaptive voltage control commands, the output voltage, the output current, and the over-current comparison signal, wherein the voltage identification code is configured to control the output voltage. The switching control circuit is configured to provide a switching control signal based on the position signal to control the at least one switch of the DC-DC converter, wherein the control circuit is configured to control the output voltage to vary along a nonlinear load line of the output voltage versus the output current, such that when the output current is smaller than the current limit value, the output voltage varies along a first voltage position curve, and when the output current is larger than the current limit value, the output voltage varies along a second voltage position curve.

Embodiments of the present invention are further directed to a control circuit for a DC-DC converter, wherein the DC-DC converter comprises at least one switch, and is configured to receive an input voltage and to provide an output voltage and an output current. The control circuit comprises an over-current comparison circuit, an adaptive voltage position (AVP) control circuit, and a switching control circuit. The over-current comparison circuit is configured to provide an over-current comparison signal by comparing the output current with a current limit value. The adaptive voltage position (AVP) control circuit is configured to provide a position signal based on a voltage identification code, the output voltage, the output current, and the over-current comparison signal. The switching control circuit is configured to provide a switching control signal based on the position signal to control the at least one switch of the DC-DC converter. Wherein when the output current is smaller than the current limit value, the control circuit controls the output voltage to vary along a first voltage position curve, and when the output current is larger than the current limit value, the control circuit controls the output voltage to vary along a second voltage position curve. Until the output current becomes larger than a current threshold, the output voltage varies along a third voltage position curve, wherein the current threshold is larger than the current limit value. Each of the first voltage position curve, the second voltage position curve and the third voltage position curve is a curve of the output voltage against the output current with a slope.

Embodiments of the present invention are further directed to an adaptive voltage position (AVP) control method for a DC-DC converter, wherein the DC-DC converter comprises at least one switch, and is configured to receive an input voltage and provide an output voltage and an output current. The AVP control method comprises receiving a voltage identification code for controlling the output voltage, providing an over-current comparison signal via comparing the output current with a current limit value, providing a position signal based on the voltage identification code, the output voltage, the output current and the over-current comparison signal, and providing a switching control signal based on the position signal to control the at least one switch of the DC-DC converter. Wherein when the output current is smaller than the current limit value, controlling the output voltage to vary along a first voltage position curve with increasing of the output current, and when the output current is larger than the current limit value, controlling the output voltage to vary along a second voltage position curve with increasing of the output current.

These and other features of the present invention will be readily apparent to persons of ordinary skill in the art upon reading the entirety of this disclosure, which includes the accompanying drawings and claims.

BRIEF DESCRIPTION OF THE DRAWING

The present invention can be further understood with reference to the following detailed description and the appended drawings, wherein like elements are provided with like reference numerals.

DETAILED DESCRIPTION

Figure 1:
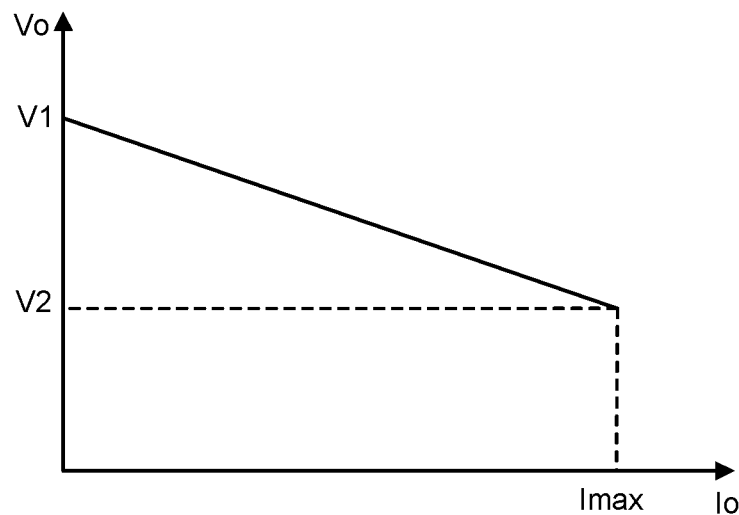
FIG. 1 schematically shows a basic principle of traditional adaptive voltage position (AVP) control.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

A control circuit for a DC-DC converter illustrated in the embodiments comprises an over-current comparison circuit, an adaptive voltage position (AVP) control circuit and a switching control circuit. The over-current comparison circuit is configured to generate an over-current comparison signal. The AVP control circuit is configured to generate a position signal based on a voltage identification code, an output voltage, an output current and the over-current comparison signal. The switching control circuit is configured to provide a switching control signal based on the position signal. When the output current is smaller than a current limit value, the output voltage varies along a first voltage position curve, and when the output current is larger than the current limit value, the output voltage varies along a second voltage position curve. When the output current becomes further larger than a current threshold, the output voltage varies along a third voltage position curve. Wherein each of the first voltage position curve, the second voltage position curve and the third voltage position curve is a curve of the output voltage against the output current with a slope. In one example, varying along the first voltage position curve comprises remaining at a first voltage modulation point. In one example, varying along the third voltage position curve comprises remaining at a second voltage modulation point, and the second voltage modulation point is lower than the first voltage modulation point. The control circuit can provide a nonlinear load line of the output voltage versus the output current with current limit, which allows the DC-DC converter to provide a stable output voltage even within a wider output current range, and thus meet requirements of a load more flexibly. The load may be but not be limited to a central processing unit (CPU), a garaphics processing unit (GPU), etc. The current limit value may be programmable. For example, the current limit value may be predetermined larger than the output current at an intersection of the first voltage position curve and the second voltage position curve, or may be controlled in real time by the load or a system controller, e.g., a host computer, an external controller, a dedicated power management integrated circuit (PMIC), a field programmable gate array (FPGA), or a digital signal processor (DSP).

Figure 2:
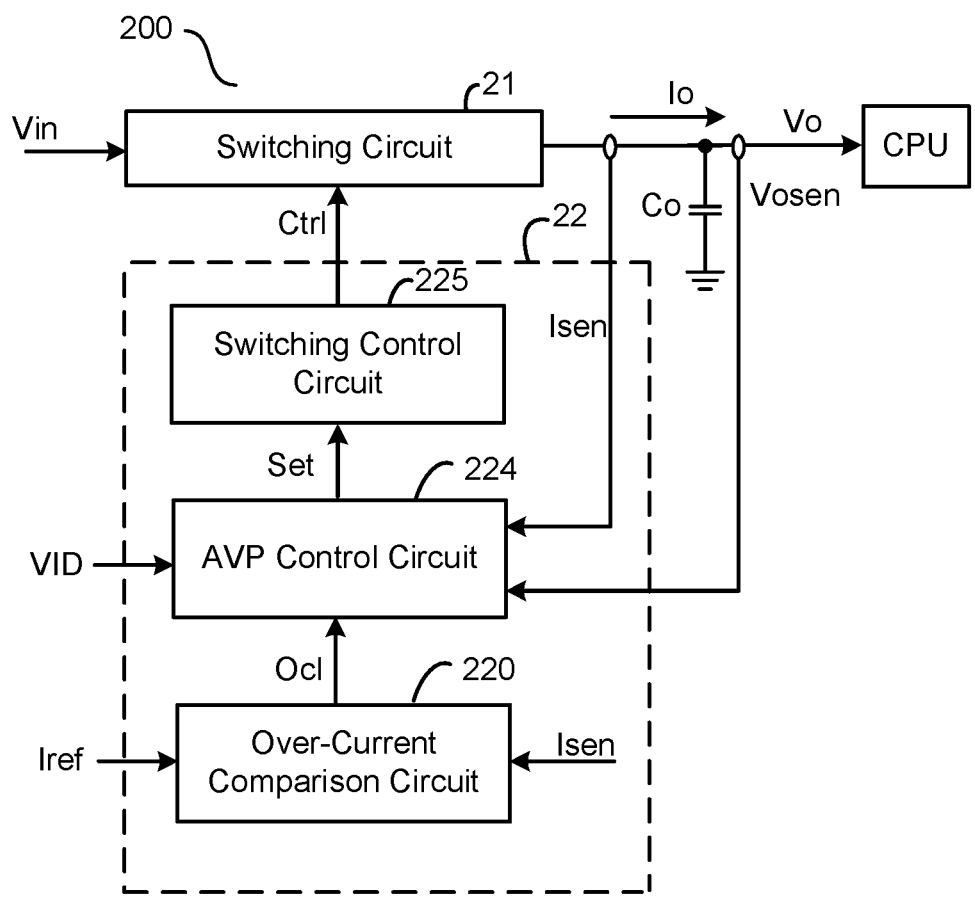
FIG. 2 schematically shows a DC-DC converter 200 in accordance with an embodiment of the present invention.

FIG. 2 schematically shows a DC-DC converter 200 in accordance with an embodiment of the present invention. In the example of FIG. 2, DC-DC converter 200 comprises a switching circuit 21 and a control circuit 22. Switching circuit 21 receives an input voltage Vin at an input terminal, and provides an output voltage Vo and an output current Io to the load (e.g., CPU shown in FIG. 2) at an output terminal. An output capacitor Co is between the output terminal of switching circuit 21 and a ground. Control circuit 22 comprises an over-current comparison circuit 220, an AVP control circuit 224, and a switching control circuit 225. In one embodiment, over-current comparison circuit 220 receives a current sense signal Isen representative of output current Io, and provides an over-current comparison signal OcI by comparing current sense signal Isen with an over-current reference signal Iref representative of current limit value I(ocI), that is, over-current comparison signal OcI is generated by comparing the output current and current limit value I(ocI). AVP control circuit 224 receives a voltage identification code VID provided by the load to determine output voltage Vo, an output voltage sense signal Vosen representative of output voltage Vo (e.g., equals or be proportional to output voltage Vo), current sense signal Isen and over-current comparison signal OcI, and provides a position siganl Set based on voltage identification code VID, output voltage Vo, output current Io and over-current comparison signal OcI. Switching control circuit 225 generates switching control signal Ctrl based on position signal Set to control at least one switch of DC-DC converter 200.

Figure 3:
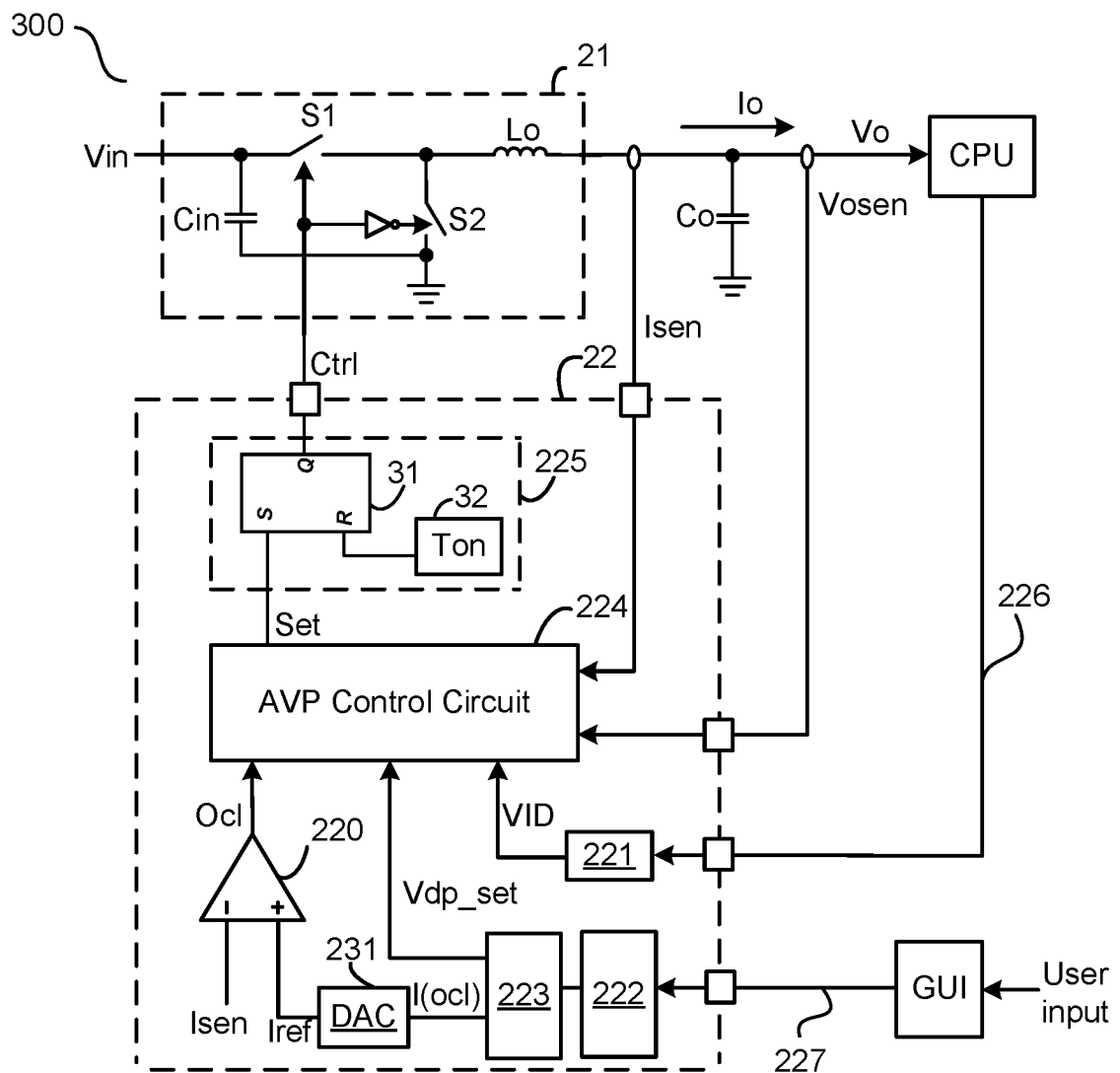
FIG. 3 schematically shows a DC-DC converter 300 in accordance with another embodiment of the present invention.

FIG. 3 schematically shows a DC-DC converter 300 in accordance with another embodiment of the present invention. In the example of FIG. 3, control circuit 22 further comprises an interface circuit 221, an interface circuit 222, a memory 223. Interface circuit 221 receives voltage identification code VID sent by the load through a communication bus 226. Voltage identification code VID is received to provide a reference voltage Vref1 to DC-DC converter 200. In one example, communication bus 226 comprises a parallel voltage identification (PVID) bus, a serial voltage identification (SVID) bus and an adaptive voltage scaling bus (AVSBus), etc. In one example, interface circuit 221 comprises a PVID interface circuit, an SVID interface circuit and an AVSBus interface circuit, etc. Interface circuit 222 receives a set of adaptive voltage control commands Vdp_set and a current limit value I(ocI) through a communication bus 227. Set of adaptive voltage control commands Vdp_set is configured to determine nonlinear features of the nonlinear load line, and current limit value I(ocI) is configured to provide over-current reference signal Iref. Set of adaptive voltage control commands Vdp_set and current limit value I(ocI) may be written in by users through a graphical user interface (GUI), or provided by the system controller or the load. In one example, communication bus 227 may comprise a power management bus (PMBus), a system management bus (SMBus), a bidirectional synchronous serial bus I2C, etc., and interface circuit 222 may comprise a PMBus interface circuit, an SMBus interface circuit, and I2C interface circuit, etc. Memory 223 is configured to store set of adaptive voltage control commands Vdp_set and current limit value I(ocI) received through interface circuit 222.

In the example of FIG. 3, control circuit 22 further comprises a digital-analog converting circuit 231. Digital-analog converting circuit 231 provides over-current reference signal Iref according to current limit value I(ocI). In the example of FIG. 3, over-current comparison circuit 220 comprises a comparator. The comparator has an inverting input terminal to receive current sense signal Isen, a non-inverting input terminal to receive over-current reference signal Iref, and an output terminal to provide over-current comparison signal OcI.

In the example of FIG. 3, switching circuit 21 is a buck circuit for illustration. In the example of FIG. 3, switching circuit 21 comprises a switch S1, a switch S2, an output inductor Lo and an input capacitor Cin. A first terminal of switch S1 is coupled to the input terminal of switching circuit 21 to receive input voltage Vin. A first terminal of switch S2 is coupled to a second terminal of switch S1, and a second terminal of switch S2 is coupled to the ground. Switch S1 and switch S2 are turned ON and OFF complementarily under the control of switching control signal Ctrl. Output inductor Lo has a first terminal coupled to the second terminal of switch S1 and the first terminal of switch S2, and has a second terminal coupled to the output terminal to provide output voltage Vo. Input capacitor Cin is coupled between the input terminal and the ground. In one embodiment, current sense signal Isen represents a current flowing through output inductor Lo. In one embodiment, output voltage sense signal Vosen is a differential voltage.

In the example of FIG. 3, AVP control circuit 224 further receives set of adaptive voltage control commands Vdp_set. In one example, set of adaptive voltage control commands Vdp_set comprises a voltage offset data OFFSET2 to participate in controlling an offset of the second voltage position curve, a voltage offset data OFFSET3 to participate in controlling an offset of the third voltage position curve, a voltage position resistance data DRP1 to control a slope of the first voltage position curve, a voltage position resistance data DRP2 to control a slope of the second voltage position curve, and a voltage position resistance data DRP3 to control a slope of the third voltage position curve. In one embodiment, an offset of the first voltage position curve is controlled by voltage identification code VID. In one embodiment, the offset of the second voltage position curve is controlled by voltage identification code VID and voltage offset data OFFSET2. In one embodiment, the offset of the third voltage position curve is controlled by voltage identification code VID and voltage offset data OFFSET3. In one embodiment, when the slope of the first voltage position curve is zero, the offset of the first voltage position curve is the first voltage modulation point, such that the first voltage modulation point is controlled by voltage identification code VID. In one embodiment, when the slope of the third voltage position curve is zero, the offset of the third voltage position curve is the second voltage modulation point, such that the second voltage modulation point is controlled by voltage identification code VID and set of adaptive voltage control commands Vdp_set, e.g., the second voltage modulation point is controlled by a sum of voltage identification code VID and voltage offset data OFFSET3.

In one embodiment, when output current Io is smaller than current limit value I(ocI), that is, when current sense signal Isen is smaller than over-current reference signal Iref, control circuit 22 controls output voltage Vo to vary along the first voltage position curve as output current Io varies. When output current Io is larger than current limit value I(ocI), that is, when current sense signal Isen is larger than over-current reference signal Iref, control circuit 22 controls output voltage Vo to vary along the second voltage position curve as output current Io varies. When output current Io becomes further larger than a current threshold, control circuit 22 controls output voltage Vo to vary along the third voltage position curve as output current Io varies, wherein the current threshold is larger than the current limit value.

In the example of FIG. 3, switch S1 is turned on by switching control circuit 225 based on position signal Set. In one embodiment, switching control circuit 225 comprises an RS flip-flop 31 and an ON time control circuit 32. When position signal Set becomes active, RS flip-flop 31 is set, switch S1 is turned ON and switch S2 is turned OFF by switching control signal Ctrl. Until an ON time period of switch S1 reaches a time period predetermined by ON time control circuit 32, RS flip-flop 31 is reset, switch S1 is turned OFF and switch S1 is turned ON by switching control signal Ctrl. One with ordinary skill in the art should understand that the detailed circuit structure of switching control circuit 225 is not limited by the example shown in FIG. 3.

Figure 4:
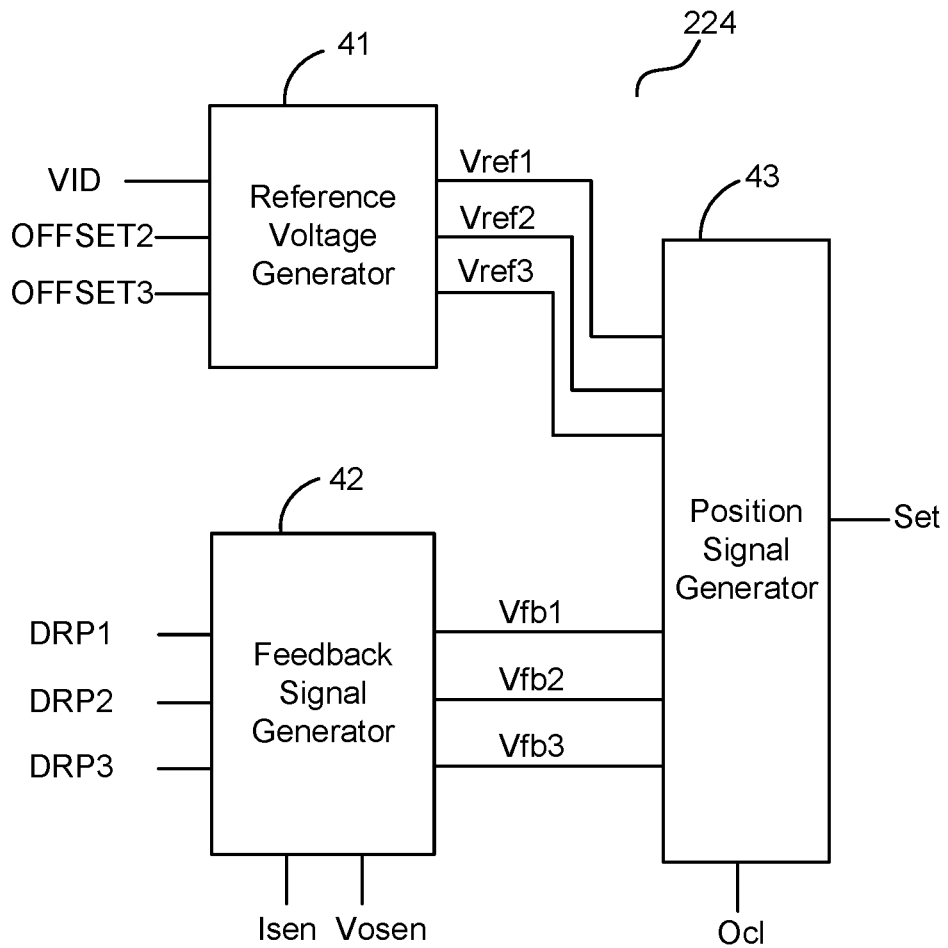
FIG. 4 schematically shows an AVP control circuit 224 in accordance with an embodiment of the present invention.

FIG. 4 schematically shows an AVP control circuit 224 in accordance with an embodiment of the present invention. In the example of FIG. 4, AVP control circuit 224 comprises a reference voltage generator 41, a feedback signal generator 42 and a position signal generator 43. Reference voltage generator 41 generates reference voltages Vref1-Vref3 based on voltage identification code VID and voltage offset datas OFFSET2-OFFSET3. In one embodiment, reference voltage generator 41 generates reference voltage Vref1 based on voltage identification code VID, generates reference voltage Vref2 based on voltage identification code VID and voltage offset data OFFSET2, and generates reference voltage Vref3 based on voltage identification code VID and voltage offset data OFFSET3. In one embodiment, feedback signal generator 42 generates feedback signals Vfb1-Vfb3 based on output voltage sense signal Vosen and output current sense signal Isen under the control of voltage position resistance datas DRP1-DRP3. In one embodiment, position signal generator 43 generates position signal Set based on reference voltages Vref1-Vref3, feedback signals Vfb1-Vfb3, and over-current comparison signal OcI. For example, position signal generator 43 generates position signal Set based on a comparison signal Set1 generated by comparing reference voltage Vref1 with feedback signal Vfb1, a comparison signal Set2 generated by comparing reference voltage Vref2 with feedback signal Vfb2, a comparison signal Set3 generated by comparing reference voltage Vref3 with feedback signal Vfb3, and over-current comparison signal OcI.

Figure 5:
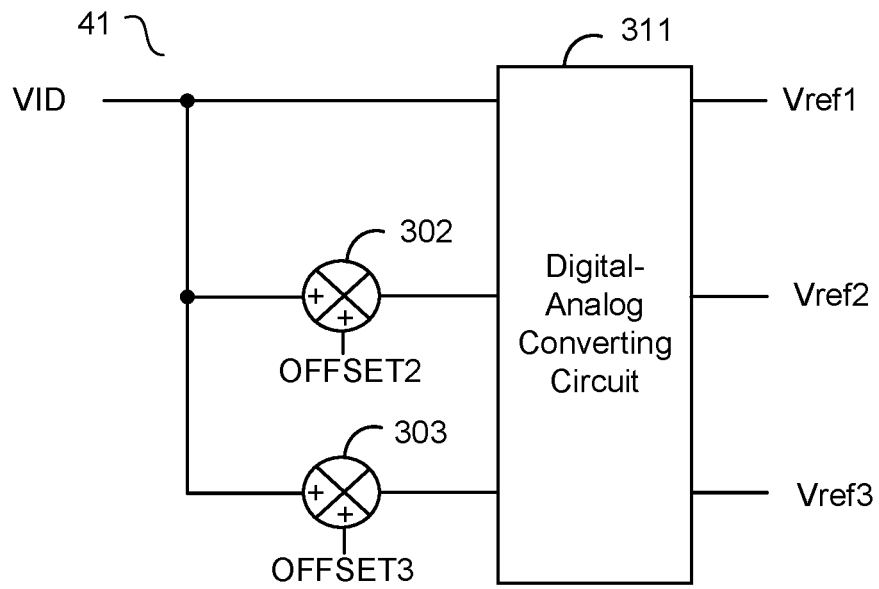
FIG. 5 schematically shows a reference voltage generator 41 in accordance with an embodiment of the present invention.

FIG. 5 schematically shows reference voltage generator 41 in accordance with an embodiment of the present invention. In the example of FIG. 5, reference voltage generator 41 comprises operational circuits 302-303 and a digital-analog converting circuit 311. Operational circuit 302 receives voltage identification code VID and voltage offset data OFFSET2, and sends the sum of voltage identification code VID and voltage offset data OFFSET2 (VID+OFFSET2) to digital-analog converting circuit 311. Digital-analog converting circuit 311 generates reference voltage Vref1 based on voltage identification code VID, and generates reference voltage Vref2 based on the sum of voltage identification code VID and voltage offset data OFFSET2 (VID+OFFSET2). Operational circuit 303 receives voltage identification code VID and voltage offset data OFFSET3, and sends the sum of voltage identification code VID and voltage offset data OFFSET3 (VID+OFFSET3) to digital-analog converting circuit 311. Digital-analog converting circuit 311 further generates reference voltage Vref3 based on the sum of voltage identification code VID and voltage offset data OFFSET3 (VID+OFFSET3). One with ordinary skill in the art should understand that the detailed circuit structure of reference voltage generator 41 is not limited by the example shown in FIG. 5.

Figure 6:
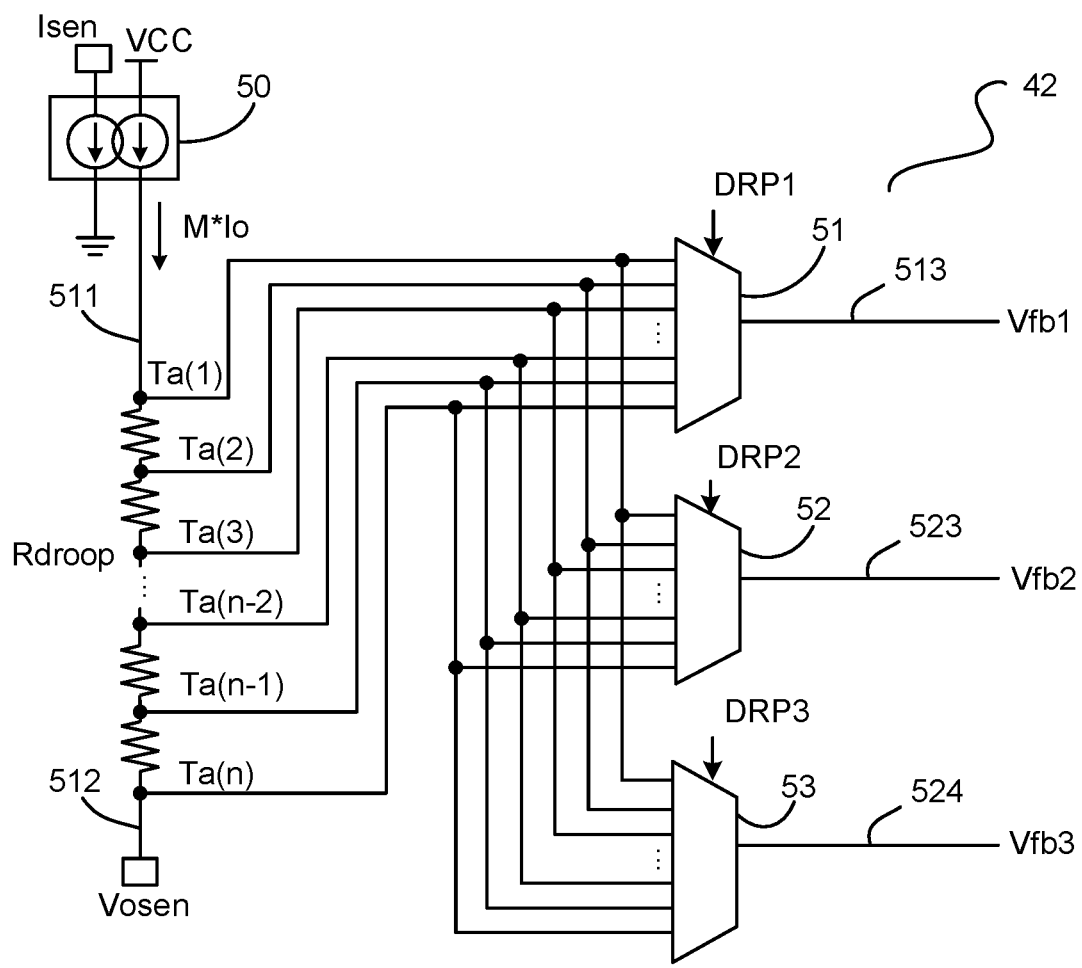
FIG. 6 schematically shows a feedback signal generator 42 in accordance with an embodiment of the present invention.

FIG. 6 schematically shows feedback signal generator 42 in accordance with an embodiment of the present invention. One with ordinary skill in the art should understand that the detailed circuit structure of feedback signal generator 42 is not limited by the example shown in FIG. 6. In the example of FIG. 6, feedback signal generator 42 comprises a current mirror 50, a voltage position resistor Rdroop, and multiplexers 51-53. Current mirror 50 generates a mirror current M*Io which is proportional to output current Io based on output current sense signal Isen, wherein the coefficient M is positive. Voltage position resistor Rdroop has a current sense terminal 511 and a voltage sense terminal 512. Current sense terminal 511 is coupled to current mirror 50 to receive mirror current M*Io, and voltage sense terminal 512 receives output voltage sense signal Vosen. Voltage position resistor Rdroop has a plurality of nodes Ta(1), Ta(2), . . . Ta(n), and each node corresponds to a voltage. Multiplexer 51 comprises a plurality of input terminals which are respectively coupled to the plurality of nodes of voltage position resistor Rdroop. Multiplexer 51 comprises an output terminal 513 to provide feedback signal Vfb1. Multiplexer 51 selects one of the plurality of nodes based on voltage position resistance data DRP1 to control a resistance of a voltage position resistor Rdroop1 across output terminal 513 and voltage sense terminal 512, so as to provide feedback signal Vfb1. In one embodiment, feedback signal Vfb1 equals a sum of output voltage sense signal Vosen and a voltage drop generated by mirror current M*Io flowing through voltage position resistor Rdroop1. Feedback signal Vfb1 may be expressed by the following formula (1). Multiplexer 52 comprises a plurality of input terminals which are respectively coupled to the plurality of nodes of voltage position resistor Rdroop. Multiplexer 52 comprises an output terminal 523, configured to provide feedback signal Vfb2. Multiplexer 52 selects one node in the plurality of nodes based on voltage position resistance data DRP2 to control a resistance of a voltage position resistor Rdroop2 across output terminal 523 and voltage sense terminal 512, so as to get feedback signal Vfb2. In one embodiment, feedback signal Vfb2 equals a sum of output voltage sense signal Vosen and the voltage drop generated by mirror current M*Io flowing through voltage position resistor Rdroop2. Feedback signal Vfb2 may be expressed by the following formula (2). Multiplexer 53 comprises a plurality of input terminals which are respectively coupled to the nodes of voltage position resistor Rdroop. Multiplexer 53 comprises an output terminal 524, configured to provide feedback signal Vfb3. Multiplexer 53 selects one node in the plurality of nodes based on voltage position resistance data DRP3 to control a resistance of a voltage position resistor Rdroop3 across output terminal 524 and voltage sense terminal 512, so as to get feedback signal Vfb3. In one embodiment, feedback signal Vfb3 equals a sum of output voltage sense signal Vosen and the voltage drop generated by mirror current M*Io flowing through voltage position resistor Rdroop3. Feedback signal Vfb3 may be expressed by the following formula (3).

$$Vfb1 = Vosen + M*Io*Rdroop1 \quad (1)$$

$$Vfb2 = Vosen + M*Io*Rdroop2 \quad (2)$$

$$Vfb3 = Vosen + M*Io*Rdroop3 \quad (3)$$

Figure 7:
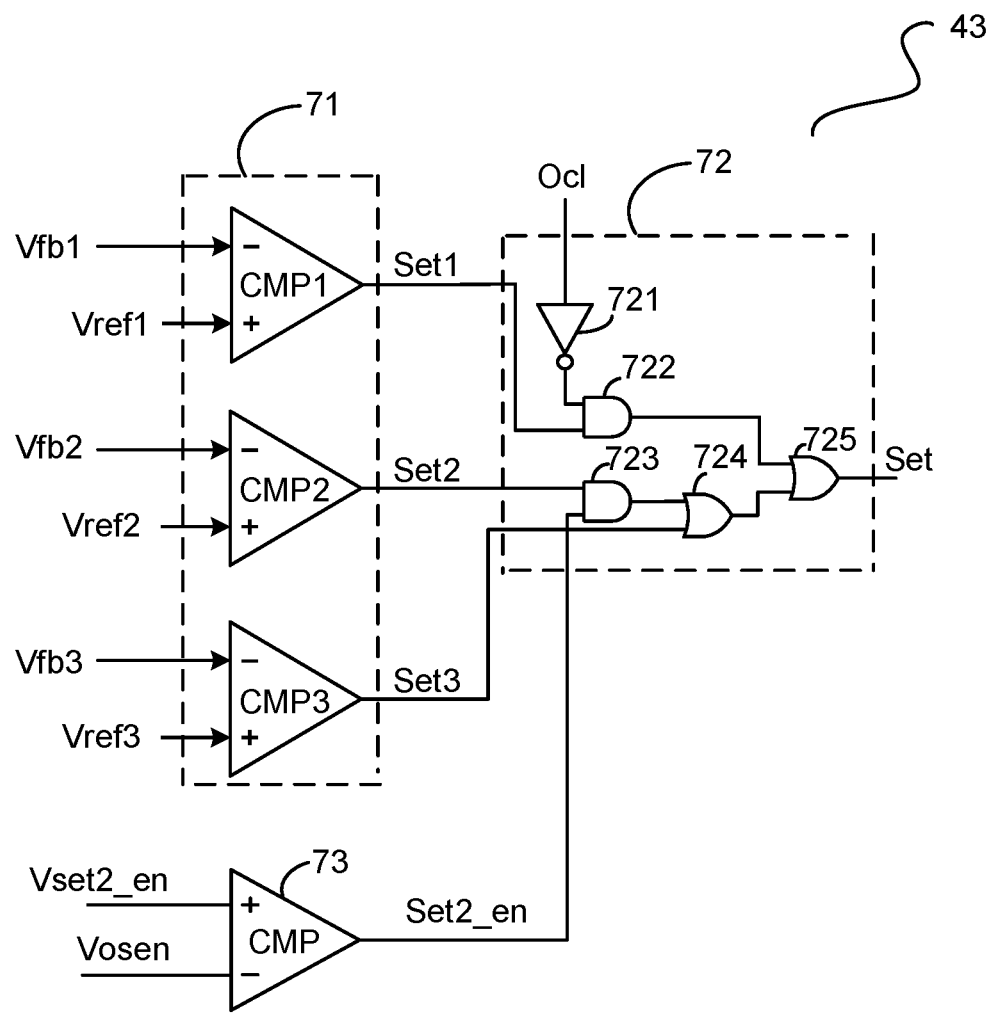
FIG. 7 schematically shows a position signal generator 43 in accordance with an embodiment of the present invention.

FIG. 7 schematically shows position signal generator 43 in accordance with an embodiment of the present invention. One with ordinary skill in the art should understand that the detailed circuit structure of position signal generator 43 is not limited by the example shown in FIG. 7. In the example of FIG. 7, position signal generator 43 comprises a comparison circuit 71 and a logic circuit 72. Comparison circuit 71 comprises comparators CMP1-CMP3. Comparator CMP1 has a non-inverting input terminal to receive reference voltage Vref1, an inverting input terminal to receive feedback signal Vfb1, and an output terminal to provide comparison signal Set1 by comparing reference voltage Vref1 with feedback signal Vfb1. When feedback signal Vfb1 is smaller than reference voltage Vref1, comparison signal Set1 becomes active (e.g. logic high). Comparator CMP2 has a non-inverting input terminal to receive reference voltage Vref2, an inverting input terminal to receive feedback signal Vfb2, and an output terminal to provide comparison signal Set2 by comparing reference voltage Vref2 with feedback signal Vfb2. When feedback signal Vfb2 is smaller than reference voltage Vref2, comparison signal Set2 becomes active (e.g. logic high). Comparator CMP3 has a non-inverting input terminal to receive reference voltage Vref3, an inverting input terminal to receive feedback signal Vfb3, and an output terminal to provide comparison signal Set3 by comparing reference voltage Vref3 with feedback signal Vfb3. When feedback signal Vfb3 is smaller than reference voltage Vref3, comparison signal Set3 becomes active (e.g. logic high). Logic circuit 72 receives comparison signals Set1-Set3 and over-current comparison signal OcI, and generates position signal Set based on comparison signals Set1-Set3 and over-current comparison signal OcI.

In one embodiment, position signal generator 43 further comprises a comparison circuit 73, which is used to blank comparison signal Set2 when output voltage sense signal Vosen is larger than a blanking threshold Vset2_en. Comparison circuit 73 comprises a comparator CMP. Comparator CMP has a non-inverting input terminal to receive blanking threshold Vset2_en, an inverting input terminal to receive output voltage sense signal Vosen, and an output terminal to provide an enable signal Set2_en based on a comparison result between output voltage sense signal Vosen and enabling threshold Vset2_en. Logic circuit 72 is further configured to receive enable signal Set2_en. When output voltage sense signal Vosen is larger than blanking threshold Vset2_en, enable signal Set2_en is low and comparison signal Set2 does not work.

In one embodiment, logic circuit 72 comprises a NOT gate 721, AND gates 722-723 and OR gates 724-725. When over-current comparison signal OcI indicates that output current Io is larger than current limit value I(ocI), position signal set is provided based on comparison signal Set2 and comparison signal Set3. For example, NOT gate 721 receives over-current comparison signal OcI, and provides an inverted signal of over-current comparison signal OcI to an input terminal of AND gate 722, and the other input terminal of AND gate 722 is configured to receive comparison signal Set1. An input terminal of AND gate 723 receives comparison signal Set2, and the other input terminal of AND gate 723 receives enable signal Set2_en. An input terminal of OR gate 724 is coupled to the output terminal of AND gate 723, and the other input terminal of OR gate 724 receives comparison signal Set3. An input terminal of OR gate 725 is coupled to an output terminal of AND gate 722, and the other input terminal of OR gate 725 is coupled to an output terminal of OR gate 724. An output terminal of OR gate 725 is configured to provide position signal Set. One with ordinary skill in the art should understand that logic circuit 72 is not limited by the detailed circuit structure shown in FIG. 7.

Figure 8:
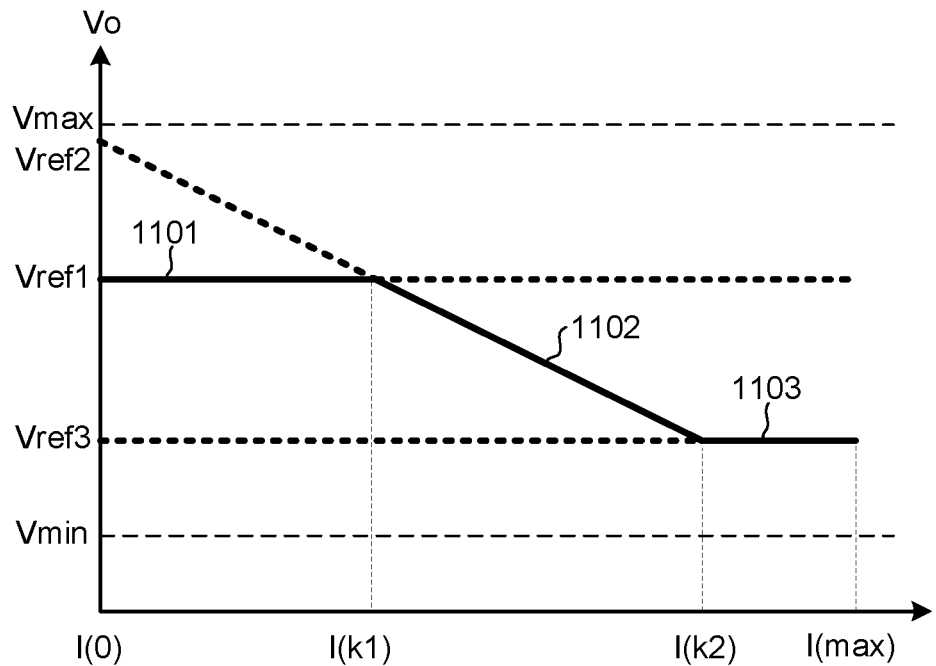
FIG. 8 shows a plot of three-stage voltage position control without current limit in accordance with an embodiment of the present invention.

FIG. 8 shows a plot of three-stage voltage position control without current limit in accordance with an embodiment of the present invention, comprising a voltage position curve 1101, a voltage position curve 1102 and a voltage position curve 1103. When output current Io is smaller than a current threshold I(k1), output current Vo varies along voltage position curve 1101, when output current Io is larger than current threshold I(k1) and smaller than a current threshold I(k2), output current Vo varies along voltage position curve 1102, and when output current Io is larger than current threshold I(k2), output current Vo varies along voltage position curve 1103. Current threshold I(k1) equals output current Io at an intersection of voltage position curve 1101 and voltage position curve 1102, and current threshold I(k2) equals output current Io at an intersection of voltage position curve 1102 and voltage position curve 1103. In one embodiment, voltage position curve 1101 is generated based on voltage identification code VID and voltage position resistance data DRP1. Voltage identification code VID is configured to control an offset of voltage position curve 1101, and voltage position resistance data DRP1 is configured to control a slope of voltage position curve 1101. For example, voltage identification code VID controls the level of output voltage Vo of voltage position curve 1101 when output current Io is zero, i.e., reference voltage Vref1, so as to control the offset of voltage position curve 1101. Voltage position resistance data DRP1 determines the resistance of voltage position resistor Rdroop1, and thus controls the slope of voltage position curve 1101. In one embodiment, voltage position curve 1102 is generated based on voltage identification code VID, voltage offset data OFFSET2 and voltage position resistance data DRP2. Voltage identification code VID and voltage offset data OFFSET2 are configured to control an offset of voltage position curve 1102, and voltage position resistance data DRP2 is configured to control a slope of voltage position curve 1102. For example, voltage identification code VID and voltage offset data OFFSET2 control the level of output voltage Vo of voltage position curve 1102 when output current Io is zero, i.e., reference voltage Vref2. Voltage position resistance data DRP2 determines the resistance of voltage position resistor Rdroop2, and thus controls the slope of voltage position curve 1102. In one embodiment, voltage position curve 1103 is generated based on voltage identification code VID, voltage offset data OFFSET3 and voltage position resistance data DRP3. Voltage identification code VID and voltage offset data OFFSET3 are configured to control an offset of voltage position curve 1103, and voltage position resistance data DRP3 is configured to control a slope of voltage position curve 1103. For example, voltage identification code VID and voltage offset data OFFSET2 control the level of output voltage Vo of voltage position curve 1103 when output current Io is zero, i.e., reference voltage Vref3. The slope of voltage position curve 1103 is determined by voltage position resistance data DRP3.

Figure 9:
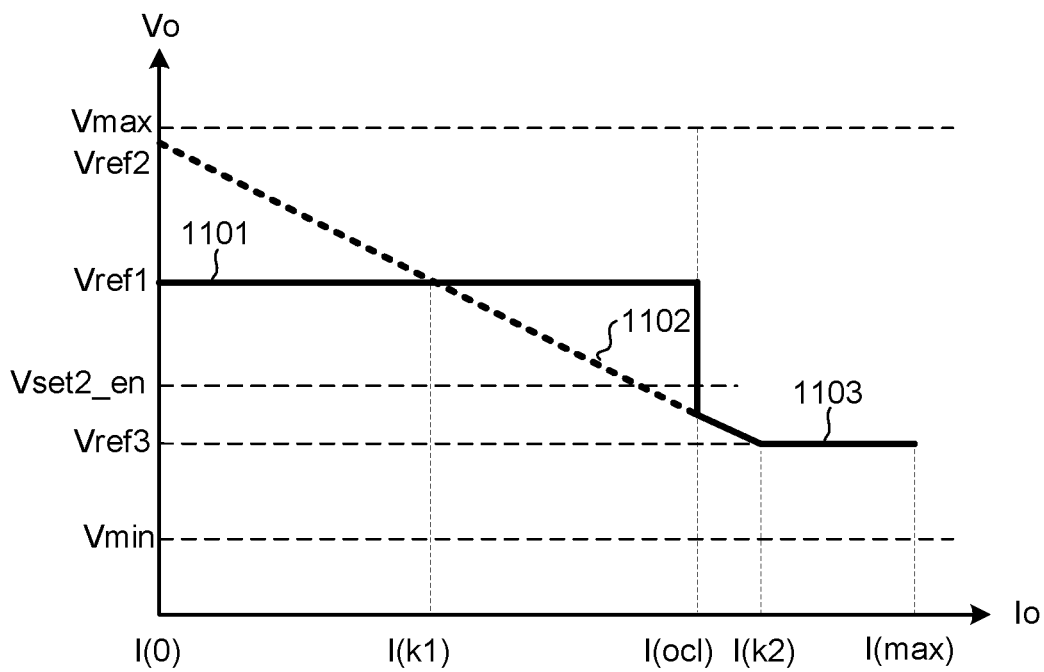
FIG. 9 shows a plot of three-stage voltage position control with current limit in accordance with an embodiment of the present invention.

FIG. 9 shows a plot of three-stage voltage position control with current limit in accordance with an embodiment of the present invention. When output current Io is smaller than current limit value I(ocI), output current Vo varies along voltage position curve 1101, when output current Io is larger than current limit value I(ocI) and smaller than current threshold I(k2), output current Vo varies along voltage position curve 1102, and when output current Io is larger than current threshold I(k2), output current Vo varies along voltage position curve 1103. In the example of FIG. 9, current limit value I(ocI) is larger than current threshold I(k1), and current threshold I(k2) is larger than current limit value I(ocI). As shown in FIG. 9, the offset of voltage position curve 1101 is reference voltage Vref1, the offset of voltage position curve 1102 is reference voltage Vref2, and the offset of voltage position curve 1103 is reference voltage Vref3. In the example of FIG. 9, slopes of voltage position curve 1101 and voltage position curve 1103 are set to be zero, and reference voltage Vref3 of voltage position curve 1103 is smaller than reference voltage Vref1, as a result, when output current Io is smaller than current limit value I(ocI), output voltage Vo remains at reference voltage Vref1, and when output current Io is larger than current limit value I(ocI), output voltage Vo varies along voltage position curve 1102 with increasing of output current Io, and until output current Io becomes larger than current threshold I(k2), output voltage Vo remains at reference voltage Vref3. In the example of FIG. 9, blanking threshold Vset2_en may be set smaller than reference voltage Vref1 and larger than the level of output voltage Vo of voltage position curve 1102 when output current Io equals current limit value I(ocI), such that when output current Io is smaller than current limit value I(ocI), output voltage Vo is larger than blanking threshold Vset2_en, and voltage position curve 1102 is blanked, such that output voltage Vo varies along voltage position curve 1101. Until output current Io becomes larger than current limit value I(ocI), output voltage Vo rapidly drops below blanking threshold Vset2_en.

Figure 10:
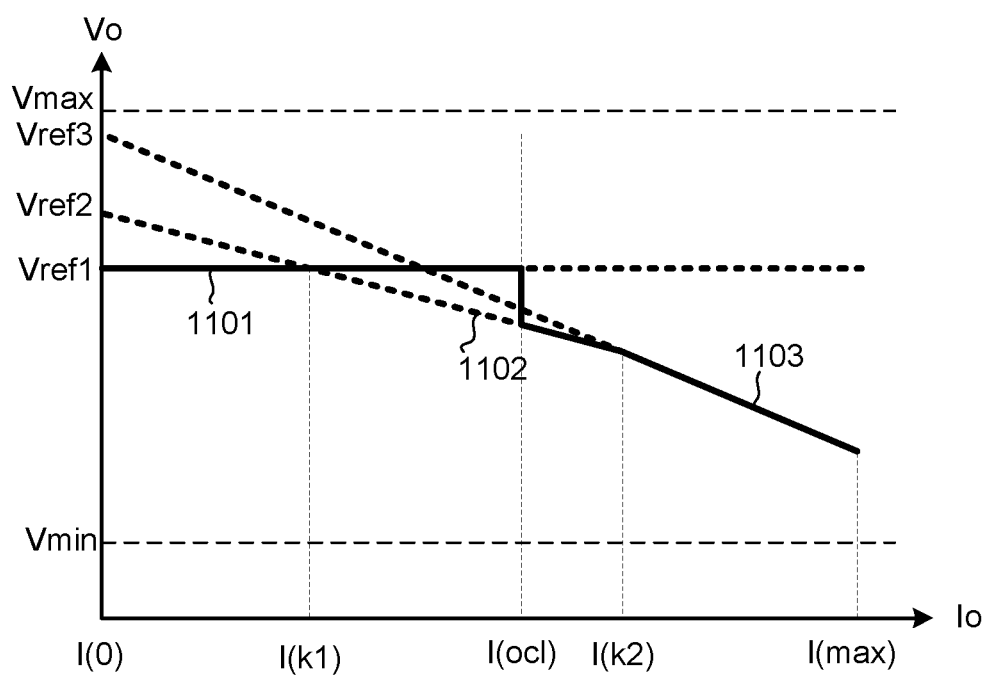
FIG. 10 shows a plot of three-stage voltage position control with current limit in accordance with another embodiment of the present invention.

FIG. 10 shows a plot of three-stage voltage position control with current limit in accordance with another embodiment of the present invention. In the example of FIG. 10, when output current Io is smaller than current limit value I(ocI), output voltage Vo remains at reference voltage Vref1 with increasing of output current Io, and when output current Io is larger than current limit value I(ocI), output voltage Vo varies along voltage position curve 1102 with increasing of output current Io, and until output current Io becomes larger than current threshold I(k2), output voltage Vo varies along voltage position curve 1103 with increasing of output current Io.

According to above embodiments, voltage position control with current limit makes it possible to maintain a relatively high output voltage within the wider output current range. One with ordinary skill in the art should understand that the slopes and offsets of voltage position curves 1101-1103 are not limited by the embodiments of FIG. 9-FIG. 10.

Figure 11:
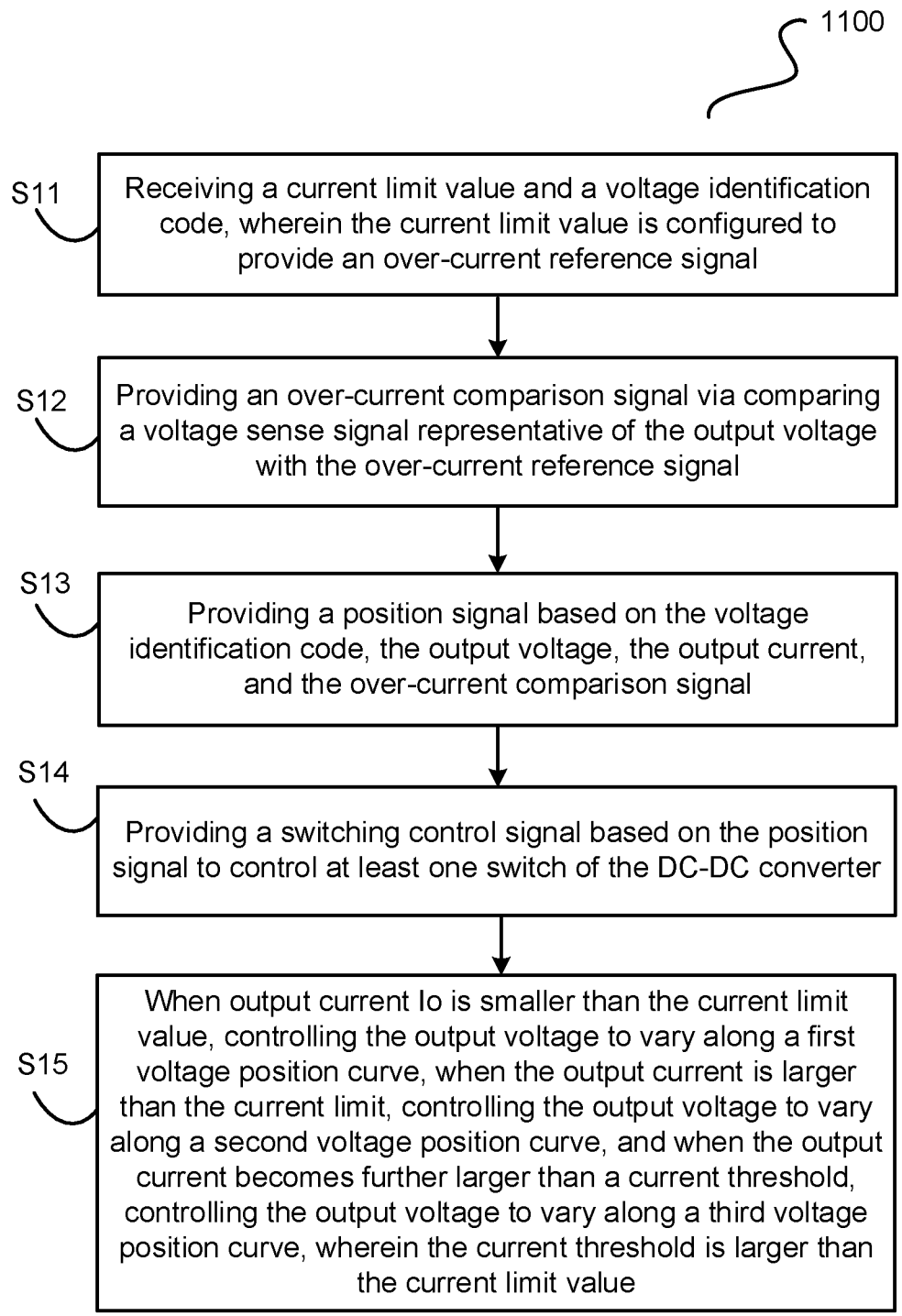
FIG. 11 illustrates an AVP control method 1100 for a DC-DC converter in accordance with an embodiment of the present invention.

FIG. 11 illustrates an AVP control method 1100 for a DC-DC converter in accordance with an embodiment of the present invention, comprising steps S11-S15. The DC-DC converter receives the input voltage, and provides the output voltage and the output current.

In step S11, receiving a current limit value and a voltage identification code, wherein the current limit value is configured to provide an over-current reference signal.

In step S12, providing an over-current comparison signal via comparing a voltage sense signal representative of the output voltage with the over-current reference signal.

In step S13, providing a position signal based on the voltage identification code, the output voltage, the output current, and the over-current comparison signal.

In step S14, providing a switching control signal based on the position signal to control at least one switch of the DC-DC converter.

In step S15, when output current Io is smaller than the current limit value, controlling the output voltage to vary along a first voltage position curve, when the output current is larger than the current limit, controlling the output voltage to vary along a second voltage position curve, and when the output current becomes further larger than a current threshold, controlling the output voltage to vary along a third voltage position curve, wherein the current threshold is larger than the current limit value.

Figure 12:
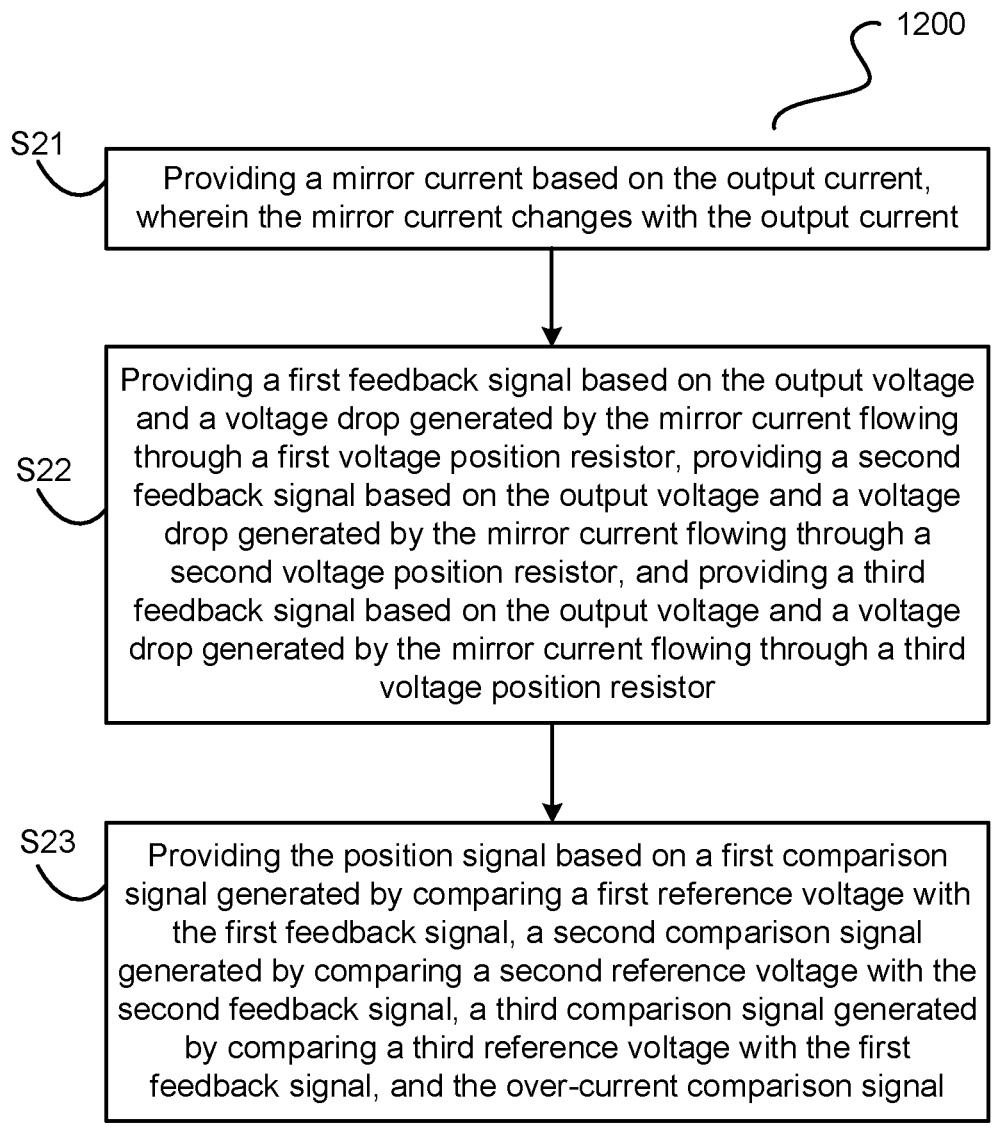
FIG. 12 illustrates a method for generating a position signal 1200 in accordance with an embodiment of the present invention.

FIG. 12 illustrates a method for generating a position signal 1200 in accordance with an embodiment of the present invention, comprising steps S21-S23.

In step S21, providing a mirror current based on the output current, wherein the mirror current changes with the output current.

In step S22, providing a first feedback signal based on the output voltage and a voltage drop generated by the mirror current flowing through a first voltage position resistor, providing a second feedback signal based on the output voltage and a voltage drop generated by the mirror current flowing through a second voltage position resistor, and providing a third feedback signal based on the output voltage and a voltage drop generated by the mirror current flowing through a third voltage position resistor.

In step S23, providing the position signal based on a first comparison signal generated by comparing a first reference voltage with the first feedback signal, a second comparison signal generated by comparing a second reference voltage with the second feedback signal, a third comparison signal generated by comparing a third reference voltage with the first feedback signal, and the over-current comparison signal.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A control circuit for a DC-DC converter, wherein the DC-DC converter comprises at least one switch, and is configured to receive an input voltage and to provide an output voltage and an output current, the control circuit comprising:
   an over-current comparison circuit, configured to provide an over-current comparison signal by comparing the output current with a current limit value;
   an adaptive voltage position (AVP) control circuit, configured to provide a position signal based on a voltage identification code, a set of adaptive voltage control commands, the output voltage, the output current, and the over-current comparison signal, wherein the voltage identification code is configured to control the output voltage; and
   a switching control circuit, configured to provide a switching control signal based on the position signal to control the at least one switch of the DC-DC converter; wherein
   The control circuit is configured to control the output voltage to vary along a nonlinear load line of the output voltage versus the output current, such that when the output current is smaller than the current limit value, the output voltage varies along a first voltage position curve, and when the output current is larger than the current limit value, the output voltage varies along a second voltage position curve.

2. The control circuit of claim 1, wherein a slope of the first voltage position curve is zero.

3. The control circuit of claim 1, further comprising:
   a first interface circuit, configured to receive the voltage identification code;
   a second interface circuit, configured to receive the set of adaptive voltage control commands and the current limit value; and
   a memory, configured to store the set of adaptive voltage control commands and the current limit value received by the second interface circuit.

4. The control circuit of claim 1, wherein the current limit value is larger than the output current at an intersection of the first voltage position curve and the second voltage position curve.

5. The control circuit of claim 1, wherein the set of adaptive voltage control commands comprises:
   a first voltage position resistance data, configured to control a slope of the first voltage position curve; and
   a second voltage position resistance data, configured to control a slope of the second voltage position curve.

6. The control circuit of claim 1, wherein the set of adaptive voltage control commands comprises a first voltage offset data to control an offset of the second voltage position curve.

7. The control circuit of claim 1, wherein when the output current becomes larger than a current threshold, the output voltage varies along a third voltage position curve, wherein the current threshold is larger than the current limit value.

8. The control circuit of claim 7, wherein the set of adaptive voltage control commands further comprises:
   a second voltage offset data, configured to participate in controlling an offset of the third voltage position curve; and
   a third voltage position resistance data, configured to control a slope of the second voltage position curve.

9. The control circuit of claim 7, wherein the AVP control circuit further comprises:
   a mirror current generator, configured to provide a mirror current according to the output current, wherein the mirror current changes with the output current;

a reference voltage generator, configured to provide a first reference voltage, a second reference voltage and a third reference voltage based on the voltage identification code and the set of adaptive voltage control commands;

a feedback signal generator, configured to provide a first feedback signal based on the output voltage and a voltage drop generated by the mirror current flowing through a first voltage position resistor, a second feedback signal based on the output voltage and a voltage drop generated by the mirror current flowing through a second voltage position resistor, and provide a third feedback signal based on the output voltage and a voltage drop generated by the mirror current flowing through a third voltage position resistor; and a position signal generator, configured to provide a first comparison signal via comparing the first feedback signal with the first reference voltage, a second comparison signal via comparing the second feedback signal with the second reference voltage, and a third comparison signal via comparing the third feedback signal with the third reference voltage, and configured to provide the position signal based on the first comparison signal, the second comparison signal, the third comparison signal, and the over-current comparison signal.

10. The control circuit of claim 1, wherein:

when the output voltage is larger than a blanking threshold, the second voltage position curve is blanked, such that the output voltage varies along the first voltage position curve; and wherein the blanking threshold is smaller than an offset of the first voltage position curve, and larger than the output voltage of the second voltage position curve when the output current equals the current limit value.

11. A control circuit for a DC-DC converter, wherein the DC-DC converter comprises at least one switch, and is configured to receive an input voltage and to provide an output voltage and an output current, the control circuit comprising:

an over-current comparison circuit, configured to provide an over-current comparison signal by comparing the output current with a current limit value;

an adaptive voltage position (AVP) control circuit, configured to provide a position signal based on a voltage identification code, the output voltage, the output current, and the over-current comparison signal; and a switching control circuit, configured to provide a switching control signal based on the position signal to control the at least one switch of the DC-DC converter; wherein when the output current is smaller than the current limit value, the control circuit controls the output voltage to vary along a first voltage position curve; and wherein when the output current is larger than the current limit value, the control circuit controls the output voltage to vary along a second voltage position curve, and until the output current becomes larger than a current threshold, the output voltage varies along a third voltage position curve, wherein the current threshold is larger than the current limit value.

12. The control circuit of claim 11, wherein the current limit value is larger than the output current at an intersection of the first voltage position curve and the second voltage position curve.

13. The control circuit of claim 11, wherein at least one of a slope of the first voltage position curve and a slope of the third voltage position curve is zero.

14. The control circuit of claim 11, further comprising:

an interface circuit, configured to receive a first voltage position resistance data to control a slope of the first voltage position curve, a second voltage position resistance data to control a slope of the second voltage position curve, and a third voltage position resistance data to control a slope of the third voltage position curve.

15. The control circuit of claim 11, further comprising:

an interface circuit, configured to receive a first voltage offset data to control an offset of the second voltage position curve and a second voltage offset data to control an offset of the third voltage position curve.

16. The control circuit of claim 11, wherein the AVP control circuit further comprises:

a mirror current generator, configured to provide a mirror current according to the output current, wherein the mirror current changes with the output current;

a feedback signal generator, configured to provide a first feedback signal based on the output voltage and a voltage drop generated by the mirror current flowing through a first voltage position resistor, a second feedback signal based on the output voltage and a voltage drop generated by the mirror current flowing through a second voltage position resistor, and provide a third feedback signal based on the output voltage and a voltage drop generated by the mirror current flowing through a third voltage position resistor; and a position signal generator, configured to provide the position signal based on the first feedback signal, the second feedback signal, the third feedback signal and the over-current comparison signal.

17. An adaptive voltage position (AVP) control method for a DC-DC converter, wherein the DC-DC converter comprises at least one switch, and is configured to receive an input voltage and provide an output voltage and an output current, the AVP control method comprising:

receiving a voltage identification code for controlling the output voltage;

providing an over-current comparison signal via comparing the output current with a current limit value;

providing a position signal based on the voltage identification code, the output voltage, the output current and the over-current comparison signal; and providing a switching control signal based on the position signal to control the at least one switch of the DC-DC converter; wherein when the output current is smaller than the current limit value, controlling the output voltage to vary along a first voltage position curve; and wherein when the output current is larger than the current limit value, controlling the output voltage to vary along a second voltage position curve.

18. The AVP control method of claim 17, further comprising:

when the output current is larger than a current threshold, the output voltage varies along a third voltage position curve, wherein the current threshold is larger than the current limit value.

19. The AVP control method of claim 18, wherein providing a position signal based on the voltage identification code, the output voltage, the output current and the over-current comparison signal further comprises:

providing a mirror current according to the output current, wherein the mirror current changes with the output current;

providing a first feedback signal based on the output voltage and a voltage drop generated by the mirror current flowing through a first voltage position resistor, providing a second feedback signal based on the output voltage and a voltage drop generated by the mirror current flowing through a second voltage position resistor, and providing a third feedback signal based on the output voltage and a voltage drop generated by the mirror current flowing through a third voltage position resistor; and providing a position signal based on a first comparison signal generated by comparing the first feedback signal with a first reference voltage, a second comparison signal generated by comparing the second feedback signal with a second reference voltage, a third comparison signal generated by comparing the third feedback signal with a third reference voltage, and the over-current comparison signal.

20. The AVP control method of claim 17, further comprising:

receiving a first voltage position resistance data to control a slope of the first voltage position curve, and a second voltage position resistance data to control a slope of the second voltage position curve.

* * * * *